US012023688B2

(12) United States Patent
Aagaard

(10) Patent No.: US 12,023,688 B2
(45) Date of Patent: Jul. 2, 2024

(54) SOLID BOWL SCREW CENTRIFUGE

(71) Applicant: GEA MECHANICAL EQUIPMENT GMBH, Oelde (DE)

(72) Inventor: Poul-Erik Aagaard, Sporup (DK)

(73) Assignee: GEA Mechanical Equipment GmbH, Oelde (DE)

( * ) Notice: Subject to any disclaimer, the term of this patent is extended or adjusted under 35 U.S.C. 154(b) by 808 days.

(21) Appl. No.: 17/266,334

(22) PCT Filed: Jul. 25, 2019

(86) PCT No.: PCT/EP2019/070072
§ 371 (c)(1),
(2) Date: Feb. 5, 2021

(87) PCT Pub. No.: WO2020/030438
PCT Pub. Date: Feb. 13, 2020

(65) Prior Publication Data
US 2021/0308696 A1 Oct. 7, 2021

(30) Foreign Application Priority Data
Aug. 8, 2018 (DE) ..................... 10 2018 119 279.7

(51) Int. Cl.
*B04B 1/20* (2006.01)
*B04B 9/12* (2006.01)

(52) U.S. Cl.
CPC .................. *B04B 1/20* (2013.01); *B04B 9/12* (2013.01); *B04B 2001/2083* (2013.01); *B04B 2001/2091* (2013.01)

(58) Field of Classification Search
CPC ..... B04B 1/20; B04B 9/12; B04B 2001/2083; B04B 2001/2091
See application file for complete search history.

(56) References Cited

U.S. PATENT DOCUMENTS 3,389,881 A 6/1968 Stelwagen
4,504,262 A 3/1985 Forsberg
(Continued)

FOREIGN PATENT DOCUMENTS

DE 6609011 U 1/1972
DE 2257513 A1 5/1974
(Continued)

OTHER PUBLICATIONS

International Search Report mailed Oct. 1, 2019 in related/corresponding International Application No. PCT/EP2019/070072.
(Continued)

*Primary Examiner* — Walter D. Griffin
*Assistant Examiner* — Shuyi S. Liu
(74) *Attorney, Agent, or Firm* — PATENT PORTFOLIO BUILDERS PLLC

(57) ABSTRACT

A solid bowl centrifuge includes a rotatable drum having a cylindrical portion with length $L_1$ and a conical portion with length $L_2$, which, when added, give the length $L_T$ of the drum. A screw is arranged in the drum and is rotatable relative to the rotatable drum with a differential speed. At least two drum bearings for supporting the drum in the housing are spaced apart with a spacing $L_L$. A spacing $L_L$ of the drum bearings for supporting the drum relative to one another is less than the length $L_T$ of the drum.

13 Claims, 4 Drawing Sheets

(56) References Cited

U.S. PATENT DOCUMENTS

Figure 1:
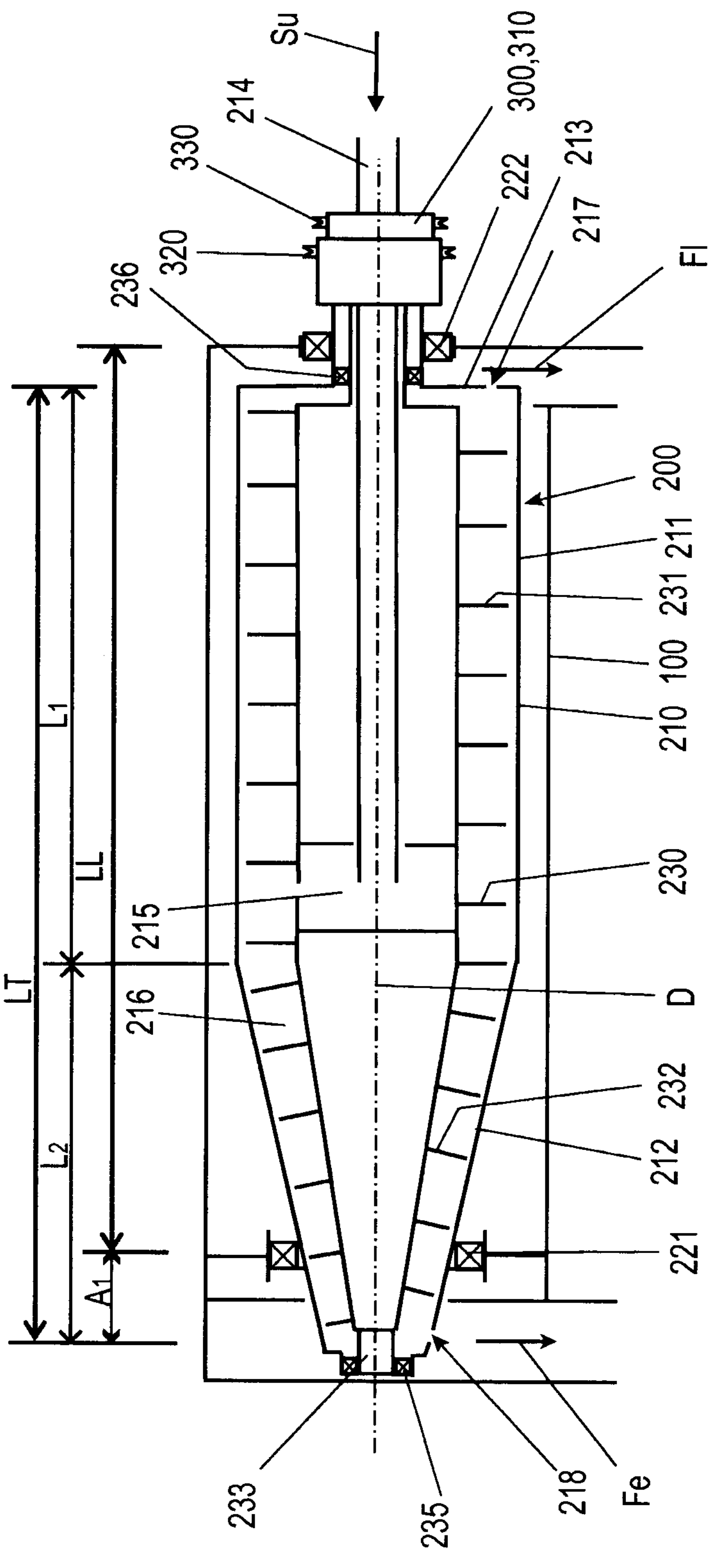

| | | | | |
|---|---|---|---|---|
| 4,957,475 | A * | 9/1990 | Kreill | B04B 11/06 494/83 |
| 8,465,406 | B2 | 6/2013 | Overberg et al. | |
| 2003/0032540 | A1 | 2/2003 | Stroucken et al. | |
| 2017/0182502 | A1* | 6/2017 | Aagaard | C02F 1/52 |

FOREIGN PATENT DOCUMENTS

| | | | | |
|---|---|---|---|---|
| DE | 2606589 | A1 | 9/1976 | |
| DE | 3134633 | A1 | 6/1982 | |
| DE | 3142779 | A1 * | 5/1983 | B04B 1/20 |
| DE | 3142779 | A1 | 5/1983 | |
| DE | 102007042549 | A1 | 3/2008 | |
| EP | 0107470 | A2 | 5/1984 | |
| GB | 539140 | A | 8/1941 | |
| JP | S58214365 | A | 12/1983 | |
| WO | WO-2007086114 | A1 * | 8/2007 | B04B 1/02 |

OTHER PUBLICATIONS

Search Report created on Jun. 24, 2019 in related/corresponding DE Application No. 10 2018 119 279.7.

Written Opinion mailed Oct. 1, 2019 in related/corresponding International Application No. PCT/EP2019/070072.

Hearing Notice dated Aug. 18, 2023 in related/corresponding IN Application No. 202147009058.

* cited by examiner

State of the art

SOLID BOWL SCREW CENTRIFUGE

BACKGROUND AND SUMMARY OF THE INVENTION

Exemplary embodiments of the invention relate to a solid bowl screw centrifuge.

EP 0 107 470 B1 and U.S. Pat. No. 4,504,262 disclose supporting the drums of decanters (solid bowl screw centrifuges) with springs. The springs are designed as coil springs, which are radially aligned to the axis of rotation. By means of screw bolts, which penetrate the coil springs, a resilient support between the bearing housings of the drum bearings and a support ring is realized in each case, which is arranged concentrically to the bearing housing and fastened to the machine frame or connected thereto. In this way, it should be possible to set operating speeds above the main resonance frequency of the system and thus to realize higher drum speeds than in decanters with conventional bearing design.

Bearing arrangements suitable for rather short drums and designed in a suspended rather than supported arrangement are shown in DE 26 06 589 A1, DE 31 34 633 A1 and DE 66 09 011 U.

DE 22 57 513 A shows a drum of a tubular centrifuge with a cylindrical drum shell, which is only conical in sections on the inside.

US 2003/0032540 A1 is mentioned as the technological background.

A generic solid bowl screw centrifuge is known from DE 10 2007 042 549 A1. This solid bowl screw centrifuge has a rotor with a drum with a horizontal axis of rotation and with a screw arranged in the drum which can be rotated at a differential speed relative to the rotating drum. Bearings or bearing devices for supporting the drum are provided at the two axial ends of the drum, and spring elements are provided for resiliently supporting the drum on a machine frame or foundation, wherein at least two of the spring elements supporting the drum are arranged at each of the two axial ends of the drum and wherein the spring elements are aligned vertically or substantially vertically. It is provided that the ratio between the length of the rotor or drum and the diameter of the rotor or drum is preferably greater than 2, preferably 2.5, in particular 3. It is also provided that the spring elements are designed as combined spring and damping elements. This design is particularly suitable for elongated solid bowl screw centrifuges in which the ratio between the length of the rotor or bowl and the diameter of the rotor or bowl is preferably greater than 2, preferably greater than 2.5, in particular greater than 3, because it is possible to operate the drum at an operating speed that is above the basic resonant frequency (rotor eigenmode) of the system.

This design has proven itself. However, there is a further need to improve the design of solid bowl screw centrifuges in a simple way so that they can generally be operated at a relatively high speed, but without having to pass through the first resonance frequency of the rotor.

Exemplary embodiments of the invention are directed to a solution to this problem.

Thus, a solid bowl screw centrifuge having a housing and a rotor which is rotatably mounted in the housing is created, which comprises at least the following features: a rotatable bowl having an axis of rotation, the drum having a cylindrical portion having a length $L_1$ and a conical portion having a length $L_2$ which, when added, define the length $L_T$ Of the drum, at least one liquid discharge arranged in the cylindrical portion of the drum, and at least one solids discharge disposed in the conical portion of the drum, a screw arranged in the drum and is rotatable relative to the rotatable drum at a differential speed, the drum and the screw together forming the rotor, drum bearings for supporting the drum in the housing, which are spaced apart at a spacing $L_L$, and at least one screw bearing for supporting the screw in the drum, wherein the spacing $L_L$ between the drum bearings is less than the length $L_T$ Of the drum.

In the conical portion with the length $L_2$, the drum is designed in a conical manner inside and outside (in relation to the drum shell).

Starting from the cylindrical portion in the conical portion, the drum diameter decreases with increasing distance from the cylindrical portion on the outside and inside, resulting in the conical shape.

The axis of rotation can be aligned horizontally. But it can also be oriented in another direction, such as vertically.

This design has the advantage that the solid bowl screw centrifuge can be operated at an advantageously high speed, since a speed-limiting first resonance frequency of the drum only occurs at a higher speed than with a larger axial spacing of the bearings due to the advantageous arrangement of the drum bearings according to the invention with reduced axial spacing. A solid bowl screw centrifuge designed in this way can therefore be operated at a high/higher speed and therefore achieves an advantageously higher separation performance compared to a solid bowl screw centrifuge of equivalent volume with conventional arrangement of the drum bearings. Axially directly adjacent bearings are functionally considered as a single bearing for the purpose of this application.

According to an aspect of the invention, the drum bearings are arranged between the drum and the housing or a part firmly connected to the housing, as a radial connection between the elements "drum" and "frame" or "housing" that allows relative rotation.

In a preferred embodiment variant of the invention, either one or both drum bearings and/or at least one or possibly both screw bearings are arranged within an axial region laying between the solids discharge and the liquid discharge of the drum. The solid bowl screw centrifuge can also be operated at an advantageously high rotational speed in this way, since the first resonance frequency of the drum, which usually limits the rotational speed, only occurs at a relatively high rotational speed due to the advantageous arrangement of the drum bearings according to the invention. Furthermore, the drum shaft sections—which are designed as shaft offsets and are designed as bearing seats—can possibly even be dispensed with. This may also result in a simplified production of a drum hub and thus the drum.

An advantageous increase in the performance of the solid bowl screw centrifuge can then also be achieved by axially extending the drum of the solid bowl screw centrifuge with a given arrangement of this kind with a defined distance between the bearings and a defined radius of the drum, resulting in a solid bowl screw centrifuge with a larger volume than would have been possible according to the prior art. g-numbers of 5000 g-7000 g can easily be achieved. The ratio of the length of the drum to the maximum inner diameter of the drum can be increased (also called "λ").

In a further preferred embodiment variant of the invention and also independently of further inventive step, either one or both of the drum bearings—and/or at least one screw bearing—directly adjoin an area of the liquid discharge and/or solids discharge of the drum. In a further preferred embodiment variant of the invention, a distance $A_1$ and/or $A_2$ can be between the respective axial end of the drum and the respective position of the drum bearing and/or preferably 0 to 35% and especially preferably 0 to 25% of the length $L_T$ Of the drum. Also in this way, the advantages of the invention are achieved advantageously and, in the case of the 25%, particularly advantageously.

In another preferred embodiment variant of the invention, one of the drum bearings can be positioned radially outside the drum or on the drum cover.

It may be provided that one of the drum bearings is positioned radially outside on the conical portion of the drum. In addition, according to a further development or alternative design, it may also be provided that one of the drum bearings is positioned radially outwards on the cylindrical portion of the drum.

It may also be advantageously provided that the drum bearing positioned radially outwards on the conical portion of the drum has a smaller internal diameter than the cylindrical portion of the drum, which reduces bearing stress and the cost of the bearing and its maintenance or replacement.

In addition, it can be provided alternatively or optionally that one of the drum bearings can be positioned axially on the outside directly on the drum cover.

The drum bearings can be designed in different ways. For example, it may be advantageous to design the drum bearings as magnetic bearings. This creates an advantageous self-centering drum bearing under load, which is also particularly suitable for an arrangement on a relatively large radius on the conical or cylindrical part.

In another preferred embodiment variant of the invention, the drum bearings are designed as roller bearings. This is advantageous in creating a cost-effective drum bearing arrangement that is easy to design and mount. The drum bearings can be designed as ceramic bearings, especially hybrid ceramic bearings. This creates an advantageous low-wear drum bearing arrangement that is easy to design and mount and which in turn is particularly suitable for an arrangement on a relatively large radius on the conical or cylindrical part.

BRIEF DESCRIPTION OF THE DRAWING FIGURES

Figure 2:
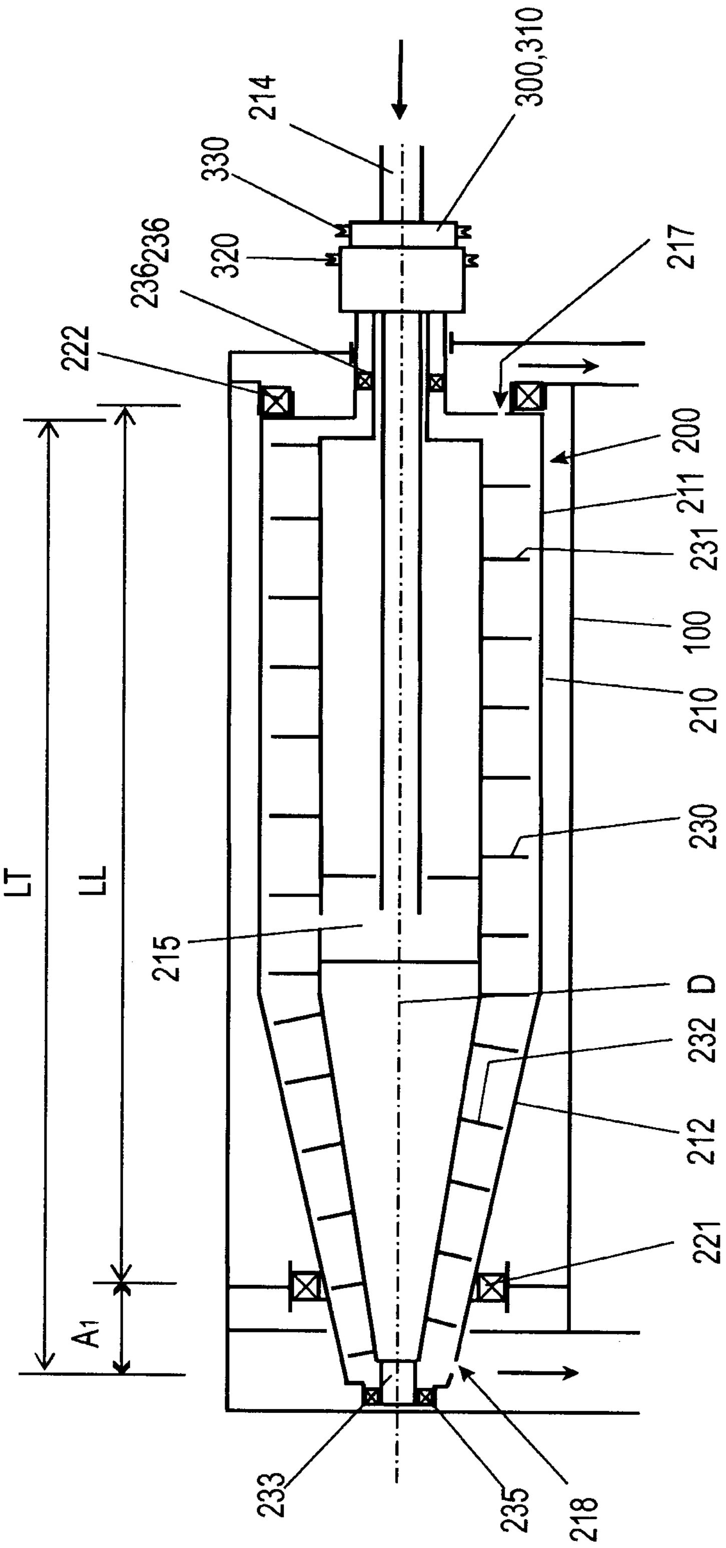
Figure 3:
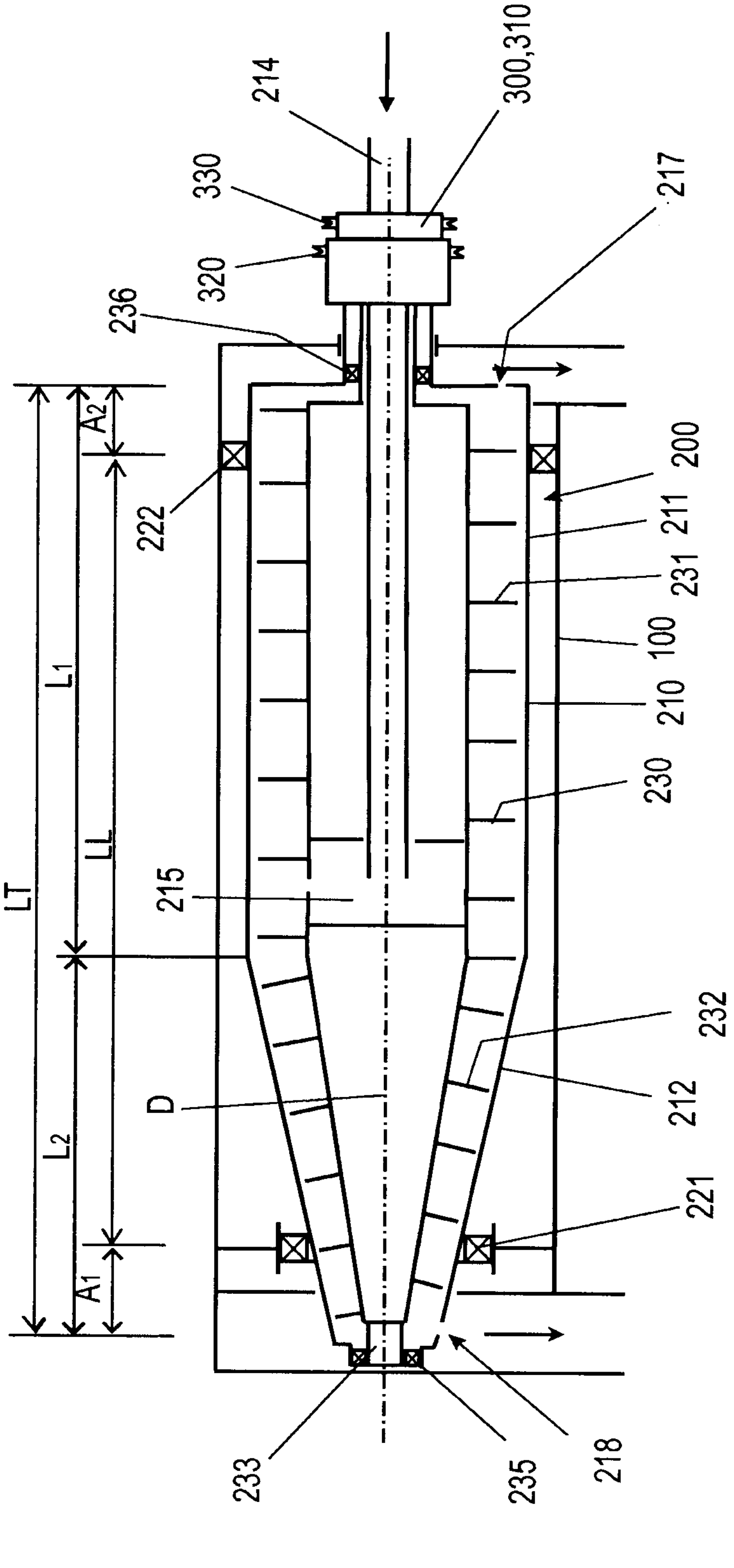
Figure 4:
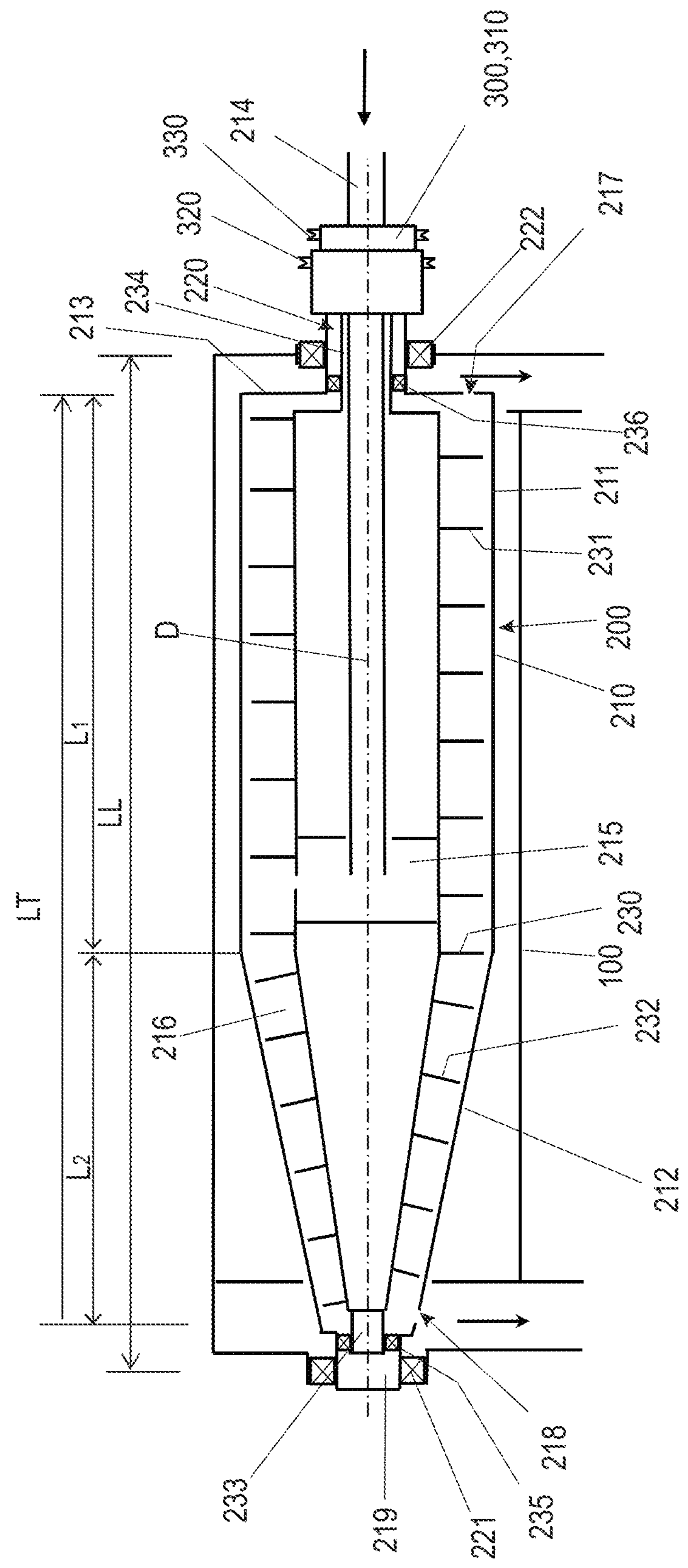

In the following, the invention is described in more detail with reference to the drawing using exemplary embodiments, wherein:

FIGS. 1 to 3 show side views of three different solid bowl screw centrifuges according to the invention, each of which is shown schematically; and FIG. 4 shows a side view of a fourth schematic diagram of a solid bowl screw centrifuge according to the prior art.

DETAILED DESCRIPTION

FIG. 1 shows a solid bowl screw centrifuge having a frame, which is not rotatable or does not rotate in operation, and preferably housing 100 and a rotor 200, which is rotatable or rotating in operation.

The rotor 200 comprises a rotating drum 210 having a horizontal axis of rotation D. The axis of rotation D can also be oriented differently, especially vertically, in space. The rotor 200 also includes a screw 230 arranged in the drum 210, whose axis of rotation coincides with that of drum 210. The screw 230 can be rotated at a different speed to drum 210 during operation.

Drum 210 has a cylindrical portion 211 with a length $L_1$ and an axially adjacent conical portion 212 with a length $L_2$. The cylindrical portion 211 is closed by a drum cover 213, which extends essentially radially. In the conical portion 212 with a length $L_2$, the drum is conical inside and outside (in relation to the drum shell).

The screw 230 here also has a cylindrical portion 231 and an axially adjacent conical portion 232. It is arranged inside the drum 210.

A feed pipe 214, which here extends concentrically to the axis of rotation, projects into drum 210 and opens into a distributor 215, through which a suspension Su to be processed can be radially fed into a centrifuging chamber 216 of drum 210. The feed pipe 214 can either be guided into drum 210 from the side of the cylindrical drum portion 211 or it can be guided into drum 210 from the side of the conical drum portion 212.

One or more liquid discharges 217 can be formed in or on the drum cover 213. These can be formed in different ways, for example as openings in the drum cover 213, which have a kind of overflow weir, or in other ways, for example as a peeling disc. At the end of the conical portion 212 at least one solids discharge 218 is formed.

As a rule, drum 210 is designed as a solid-bowl drum. At least one liquid phase FI is then clarified from solids Fe in the rotating drum 210. The at least one liquid phase emerges from the liquid discharge 217 at the drum cover 213. The solids, on the other hand, are transported by screw 230 in the direction of the solids discharge 218, where they are ejected from drum 210.

FIG. 4 shows a solid bowl screw centrifuge in which a first drum shaft section 220 is axially connected to the drum cover 213 or the actual drum 210, which is non-rotatably connected to drum 210, and a second drum shaft section 219 axially adjoins the conical drum section 212, which is also non-rotatably connected to drum 210.

A first screw shaft section 234 axially adjoins the cylindrical portion 231 of the screw 230, which is non-rotatably connected to the screw 230, and a second screw shaft section 233 axially adjoins the conical drum section 232, which is also non-rotatably connected to the screw 230.

The rotor 200 is driven by a drive unit having one or two motors (not shown here). The drive device 300 is followed by at least one gear unit 310, on which two pulleys 320, 330 are schematically shown here, indicating that the gear unit 310 has at least two interfaces for feeding a respective torque of the motor or motors into the gear unit 310 to drive the drum and the screw. Alternatively (not shown here), the rotor can also be driven by hydraulic motors, so that no gear is required. It is also possible to drive the rotor by a combination of electric motor(s) and hydraulic motor(s), using different gear boxes and eliminating the pulleys completely or partially.

The gear unit 300 rotates the drum 210 on the one hand and the screw 230 on the other. For this purpose, the gear unit 300 has two output shafts. The first output shaft is non-rotatably coupled to the first drum shaft section 220 or directly coupled to drum 210 and the second output shaft is directly or indirectly non-rotatably coupled to the first screw shaft section 234 or directly coupled to screw 230.

The drum and the shaft are each rotatably supported by two drum bearings 221, 222 arranged axially in the direction of the axis of rotation. The term "bearing" should not be too narrowly defined in this respect. Each of the bearings 221, 222 can consist of one or more single bearings, which are arranged axially directly next to each other, so that they can be considered functionally in each case as one single bearing. The bearings 221, 222 can also be designed as bearings of various types, such as roller bearings—especially ceramic bearings, hybrid ceramic bearings, magnetic bearings or plain bearings.

The drum bearings 221, 222 are arranged between drum 210 and frame 100 or a part connected to the frame, so that drum 210 can be rotated relative to frame 100. This also applies to all variants described below and covered by the claims. The drum bearings 221, 222 are preferably arranged radially between drum 210 and frame 100 or a part connected to the frame.

The screw bearings 235, 236, on the other hand, are arranged radially between the screw 230 and the drum 210, so that the screw 230 can rotate relative to the drum 210. The screw bearings 235, 236 are preferably arranged radially between the drum 210 and the screw 230.

In a possible embodiment variant (not shown), one of the screw bearings 235 in the area of the solids discharge 218 can be omitted. In this case, the rotating screw centers itself automatically, which is known e.g., from a vertical arrangement of the decanter.

According to the prior art, as shown in FIG. 4, the drum bearings 221, 222 are arranged axially outside the axial region $L_T$ of drum 210, which lies between the solids discharge 218 and the liquid discharge 217 of drum 210. In FIG. 4, for example, they are located between the solids discharge 218 and an axial end of the housing 100 adjacent thereto and the liquid discharge 217 and an axial end of the housing adjacent thereto. Accordingly, a distance $L_L$ of the drum bearings 221, 222 is greater than a length $L_T$ of the drum 210, which is the sum of the length $L_1$ of the cylindrical portion 211 of drum 210 and the length $L_2$ of the conical portion 212 of drum 210.

This means that the two drum bearings 221, 222 are arranged at a relatively large axial distance from each other in relation to the length $L_T$ of drum 210. And according to the prior art, as shown in FIG. 4, the screw bearings 235, 236 are also arranged axially outside the axial region of drum 210, which lies between the solids discharge 218 and the liquid discharge 217 of drum 210. This means that the two screw bearings 235, 236 are also arranged at a relatively large axial distance from each other in relation to the length $L_T$ of drum 210 and screw 230.

Here the invention takes a different path. Either one or both drum bearings 221, 222 are arranged within an axial region, which lies between the solids discharge 218 and the liquid discharge 217 of drum 210 or directly adjoins an area of the liquid discharge 217 and/or the solids discharge 218 of drum 210. The drum bearings 221, 222 are then positioned radially outside on the drum 210 or radially or axially outside on the drum cover 213.

If one of the drum bearings 221, 222 is arranged within the axial region laying between the solids discharge 218 and the liquid discharge 217 of drum 210, the respective other of these bearings—the other of the drum bearings 221, 222—can be arranged outside of this axial region. However, it may also be provided in the context of the invention to provide both of the respective bearings—both drum bearings 221, 222—there or in the area described above (FIG. 3).

It has been shown that in this way, and with an otherwise unchanged geometry of the rotor, the first resonance frequency of the rotor is raised and thus the drum speed could be further increased.

Different variants of this technical teaching are shown in FIGS. 1 to 3. In FIGS. 1 to 3 the length of drum 210 is marked $L_T$ and the distance between drum bearings 221 and 222 is marked $L_L$. In FIG. 4, and thus for prior-art solid bowl screw centrifuges, $L_T<L_L$ FIG. 1 shows an embodiment of the invention in which the first drum bearing 221 is assigned to the conical portion 212 of drum 210. It is axially spaced from the solids discharge 218 in the direction of the cylindrical portion 211 of drum 210. The other of the drum bearings 222 "at the other end of the drum" is outside this axial section.

The first drum bearing 221 is thus located between the solids discharge 218 and the liquid discharge 217 in the area of the conical portion 212 of drum 210 on the conical portion. The drum shaft section 219 in the area of the conical portion 212 of drum 210 can thus also be dispensed with. The length of drum 210 is greater here than the distance between the drum bearings 221 and 222, therefore $L_T>L_L$.

It is possible to design the conical portion to be axially very long and the diameter of the drum where the solids discharge is located to be relatively small. The ratio between the diameter of the drum where the solids discharge is located and the maximum inner diameter of the drum can be between 0.4 and 0.3. This can be advantageous in keeping low or reducing the energy loss caused by the solids discharge. Furthermore (see definition above), a relatively high value "λ" can be achieved.

FIG. 2 shows an embodiment variant of the invention in which the first drum bearing 221 is assigned to the conical portion 212 of drum 210 (analogous to the embodiment variant according to FIG. 1), wherein it is axially spaced from the solids discharge 218 in the direction of the cylindrical portion 211 of drum 210. The drum bearing 221 is thus located between the solids discharge 218 and the liquid discharge 217 in the area of the conical portion 212 of drum 210.

The other drum bearing 222 is here assigned to the cylindrical portion 211 of drum 210 or arranged outside on it. It is directly axially adjacent to an area of the liquid discharge 217 of drum 210. Therefore, the drum shaft section 219 in the area of the conical portion 212 of drum 210 and the drum shaft section 220 in the area of the cylindrical portion 211 of drum 210 can be omitted here. The length of drum 210 is also greater here than the distance between the drum bearings 221 and 222, therefore here too $L_T>L_L$.

FIG. 3 shows an embodiment variant of the invention in which the first drum bearing 221 is again arranged radially outside on the conical portion 212 of drum 210. It is again axially spaced from the solids discharge 218 in the direction of the cylindrical portion 211 of drum 210, analogous to the embodiment variant according to FIG. 1. The first drum bearing 221 is thus again located between the solids discharge 218 and the liquid discharge 217 in the area of the conical portion 212 of drum 210, while the second drum bearing 222 is then located on the cylindrical portion 211 of drum 210. It is axially spaced here from the liquid discharge 218 in the direction of the conical portion 212 of drum 210. The drum shaft section 220 in the area of the cylindrical portion 211 of drum 210 and the drum shaft section 218 in the area of the conical portion 212 of drum 210 can thus be dispensed with. The length of drum 210 is greater here than the distance between the drum bearings 221 and 222, therefore $L_T>L_L$.

In the exemplary embodiments shown in FIG. 1 to FIG. 3, there is a distance $A_1$ and/or $A_2$ between the respective end of drum 210 and the respective position of drum bearing 221 and/or 222. The respective distance $A_1$ and/or $A_2$, by which the respective drum bearing 221, 222 is spaced from the liquid discharge 217 and/or or the solids discharge 218 in the axial direction so that it is positioned between the liquid discharge 217 and the solids discharge 218, is preferably 0 to 35% and especially preferably 0 to 25% of the length of the drum 210 $L_T$.

By positioning the drum bearings 221, 222 each at a position within the axial region between the solids discharge 218 and the liquid discharge 217, the distance $L_L$ between the drum bearings 221, 222 is advantageously reduced in such a way that the first natural resonance of drum 210 only occurs at a higher speed than with a bearing arrangement according to the prior art (see FIG. 4). Due to the higher operating speed now possible, the achievable separation efficiency of the solid bowl screw centrifuge according to the invention is advantageously increased compared to a solid bowl screw centrifuge of the same volume according to the prior art.

The explanations regarding the arrangements of the drum bearings 221, 222 according to FIG. 1 to FIG. 3 are by no means to be understood conclusively. Rather, other advantageous arrangements of the drum bearings 221, 222 are also conceivable within the scope of the claims. However, the axial distance $L_L$ between the drum bearings 221, 222 should be shorter than the length $L_T$ of drum 210.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE NUMERALS

100 Housing
200 Rotor
210 Drum
211 Cylindrical portion
212 Conical portion
213 Drum cover
214 Feed pipe
215 Distributor
216 Centrifuging chamber
217 Liquid discharge
218 Solids discharge
219 Drum shaft section
220 Drum shaft section
221 Drum bearing
222 Drum bearing
230 Screw
231 Cylindrical portion
232 Conical portion
233 Screw shaft section
234 Screw shaft section
235 Screw bearing
236 Screw bearing
300 Drive device
310 Gear unit
320 Pulley
330 Pulley
$A_1$ Distance
$A_2$ Distance
D Axis of rotation
$L_1$ Length
$L_2$ Length
$L_L$ Distance drum bearing
$L_T$ Length drum
Su Suspension
Fe Solids
Fl Liquid phase

The invention claimed is:

1. A solid bowl screw centrifuge, comprising:
- a housing;
- a rotatable drum having an axis of rotation, wherein the rotatable drum comprises a cylindrical portion having a length $L_1$ and a conical portion having a length $L_2$, and wherein a sum of lengths $L_1$ and $L_2$ is equal to a length $L_T$ of the rotatable drum;
- a screw arranged in the rotatable drum, wherein the screw is rotatable relative to the rotatable drum at a differential speed;
- a rotor rotatably mounted in the housing, wherein the rotor is formed by the rotatable drum and the screw;
- a liquid discharge arranged in the cylindrical portion of the rotatable drum;
- a solids discharge arranged in the conical portion of the rotatable drum;
- at least two drum bearings arranged to support the rotatable drum in the housing, wherein the at least two drum bearings are spaced at a distance $L_L$; and
- at least one screw bearing arranged to support the screw in the drum,
- wherein the distance $L_L$ between the at least two drum bearings is less than the length $L_T$ of the rotatable drum, and
- wherein one of the at least two drum bearings is positioned radially outside on the conical portion of the rotatable drum,
- wherein the one of the at least two drum bearings has a smaller inner diameter than the cylindrical portion of the rotatable drum.

2. The solid bowl screw centrifuge of claim 1, wherein either one or both of the at least two drum bearings are arranged within an axial region laying between the solids discharge and the liquid discharge of the rotatable drum.

3. The solid bowl screw centrifuge of claim 1, wherein the at least two drum bearings are arranged between the rotatable drum and the housing or a part connected to the housing, or the at least one screw bearing is arranged between the screw and the rotatable drum.

4. The solid bowl screw centrifuge of claim 1, wherein either one or both of the at least two drum bearings or the at least one screw bearing directly adjoin(s) a region of the liquid discharge or the solids discharge of the rotatable drum.

5. The solid bowl screw centrifuge of claim 1, wherein a distance $A_1$ or $A_2$ between a respective axial end of the rotatable drum and a respective axial position of one or both of the at least two drum bearings is 0 to 25% of the length $L_T$ of the rotatable drum.

6. The solid bowl screw centrifuge of claim 1, wherein the at least two drum bearings are positioned radially outside on the rotatable drum or outside directly on a drum cover of the rotatable drum.

7. The solid bowl screw centrifuge of claim 1, wherein another one of the at least two drum bearings is positioned radially outwardly on the cylindrical portion of the rotatable drum.

8. The solid bowl screw centrifuge of claim 1, wherein one of the at least two drum bearings is positioned axially outside directly on a drum cover of the rotatable drum.

9. The solid bowl screw centrifuge of claim 1, wherein one or both of the at least two drum bearings are magnetic bearings.

10. The solid bowl screw centrifuge of claim 1, wherein one or both of the at least two drum bearings are roller bearings.

11. The solid bowl screw centrifuge of claim 10, wherein one or both of the at least two drum bearings are ceramic bearings or hybrid ceramic bearings.

12. The solid bowl screw centrifuge of claim 1, wherein a ratio between a diameter of the drum, at a point where the solids discharge is arranged, and a maximum diameter of the drum is between 0.4 and 0.3.

13. The solid bowl screw centrifuged of claim 1, wherein the axis of rotation of the rotatable drum is aligned horizontally or vertically.

* * * * *